Dec. 22, 1953  W. D. LEWIS  2,663,848
ELECTROMAGNETIC WAVE MICROWAVE FREQUENCY FILTER
Filed Feb. 21, 1951  11 Sheets-Sheet 1

PROTOTYPE MICROWAVE FILTER

IDEALIZED OUTPUT REGION
OF A MICROWAVE FILTER

INVENTOR
W. D. LEWIS
BY
H. O. Wright
ATTORNEY

Dec. 22, 1953 W. D. LEWIS 2,663,848
ELECTROMAGNETIC WAVE MICROWAVE FREQUENCY FILTER
Filed Feb. 21, 1951 11 Sheets-Sheet 2

AMPLITUDE VS FREQUENCY IN MICROWAVE FILTER WITH UNIFORMLY ILLUMINATED DELAY MANIFOLD

AMPLITUDE VS FREQUENCY IN MICROWAVE FILTER WITH DELAY MANIFOLD ILLUMINATED BY COSINE AMPLITUDE TAPER

ONE SPECIFIC CONFIGURATION OF OUTPUT REGION

INVENTOR
W. D. LEWIS.
BY
H. O. Wright
ATTORNEY

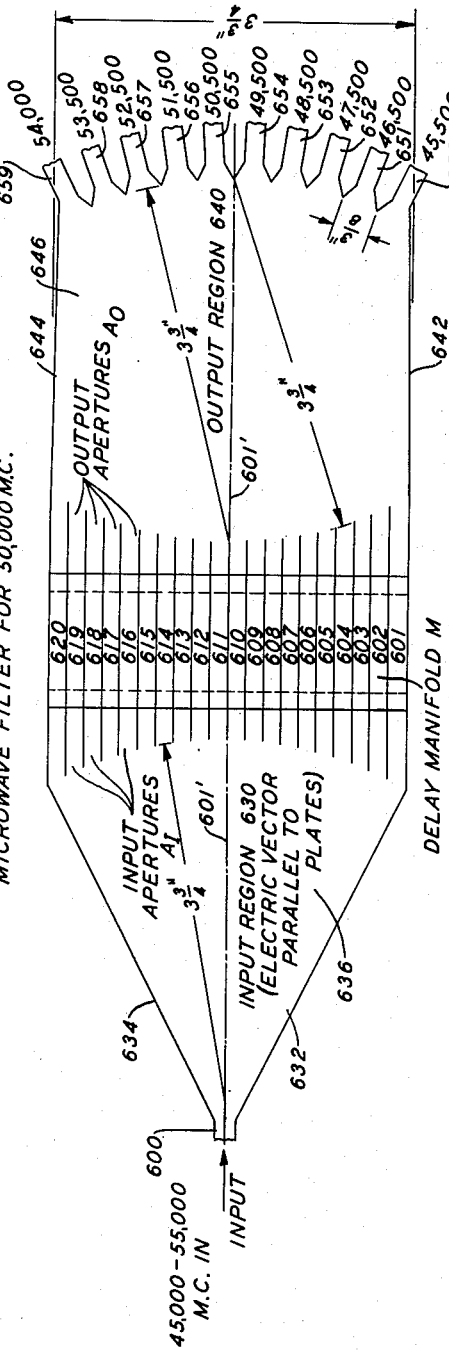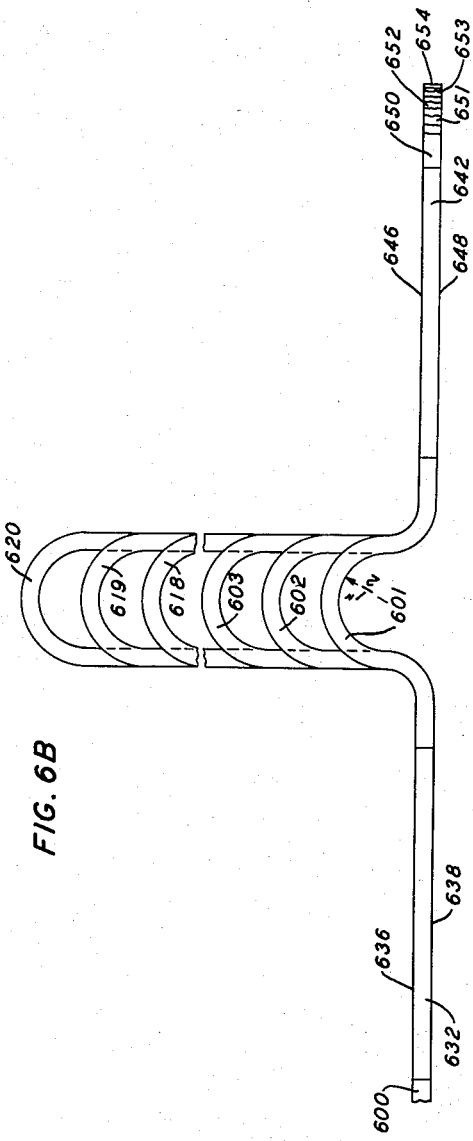

Dec. 22, 1953   W. D. LEWIS   2,663,848
ELECTROMAGNETIC WAVE MICROWAVE FREQUENCY FILTER
Filed Feb. 21, 1951   11 Sheets-Sheet 4
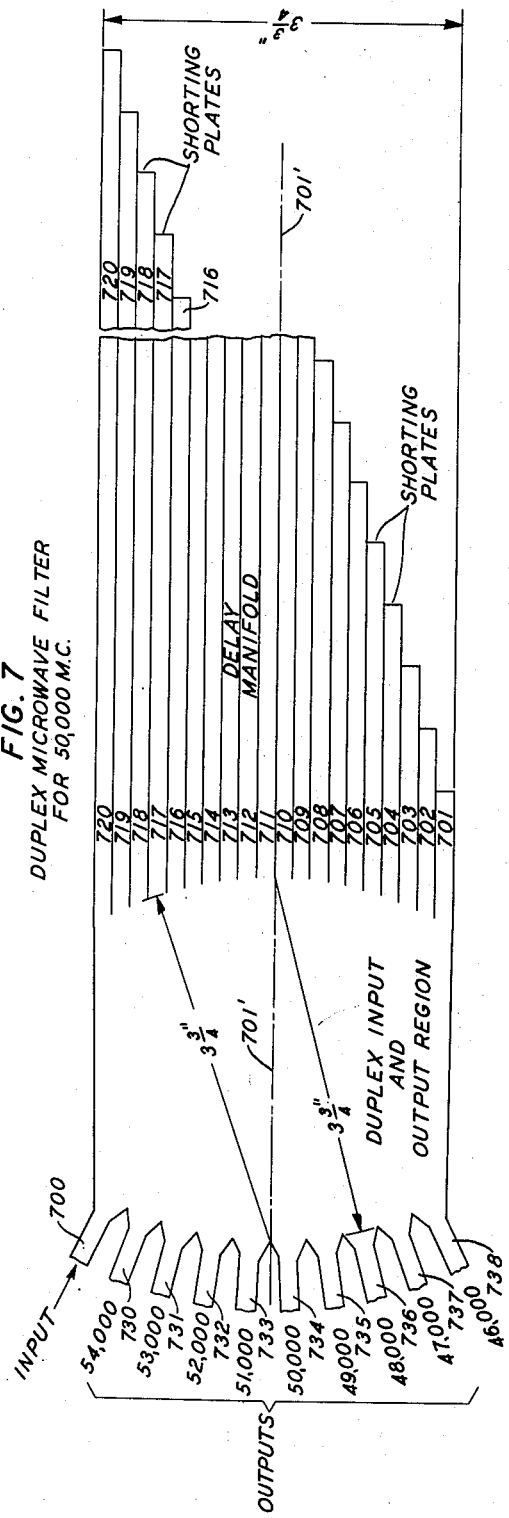
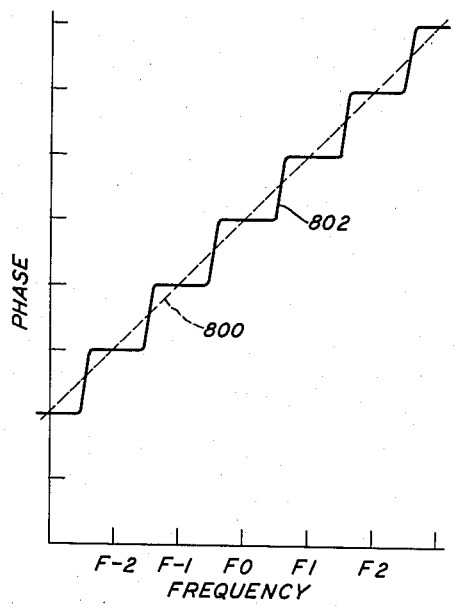
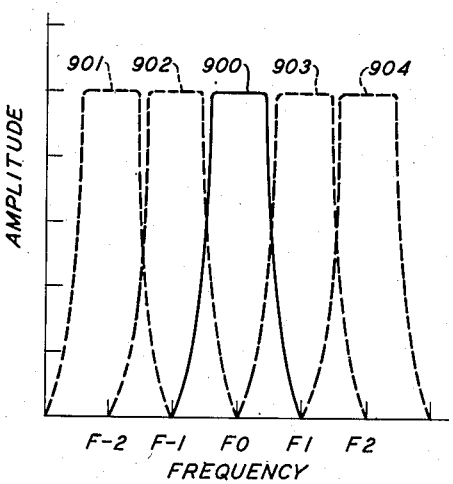
INVENTOR
W. D. LEWIS
BY
H. O. Wright
ATTORNEY

CONJUGATE COMBINATION OF TWO SIMPLE MICROWAVE FILTERS OF THE INVENTION

POSSIBLE OUTPUTS OF FILTER COMBINATION ILLUSTRATED IN FIG. 11

Dec. 22, 1953 W. D. LEWIS 2,663,848
ELECTROMAGNETIC WAVE MICROWAVE FREQUENCY FILTER
Filed Feb. 21, 1951 11 Sheets-Sheet 7

COMPOUND MICROWAVE FILTER
FOR 50,000 M.C.

INVENTOR
W. D. LEWIS
BY
H. O. Wright
ATTORNEY

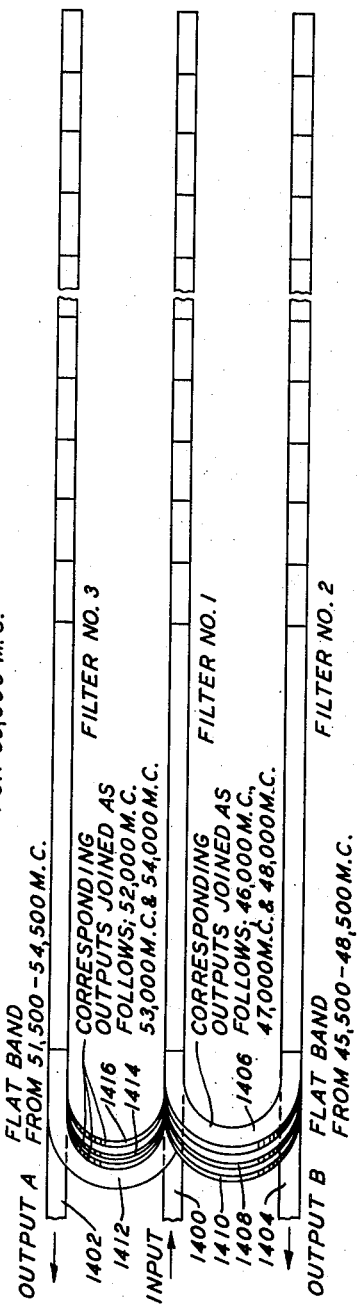
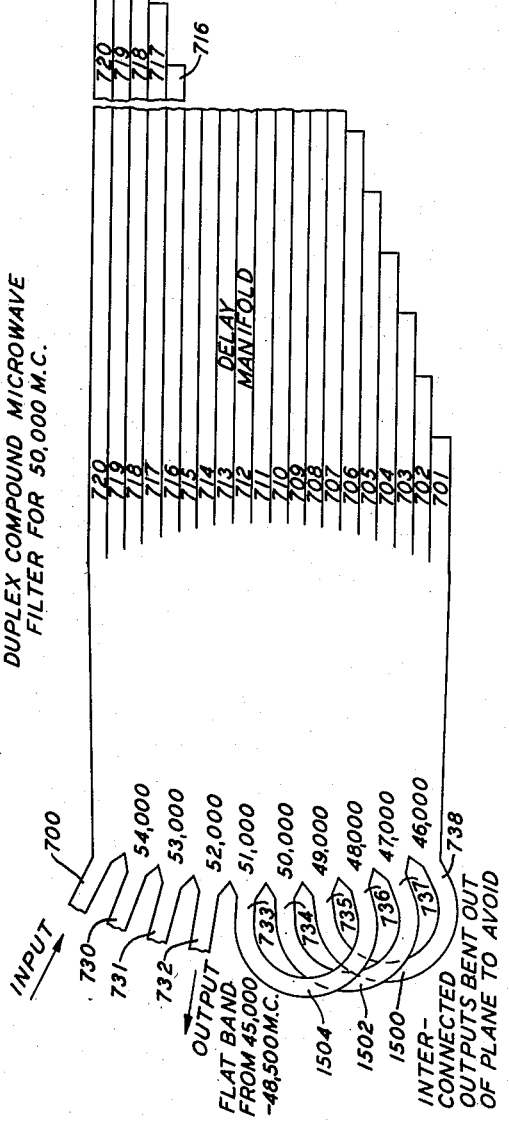

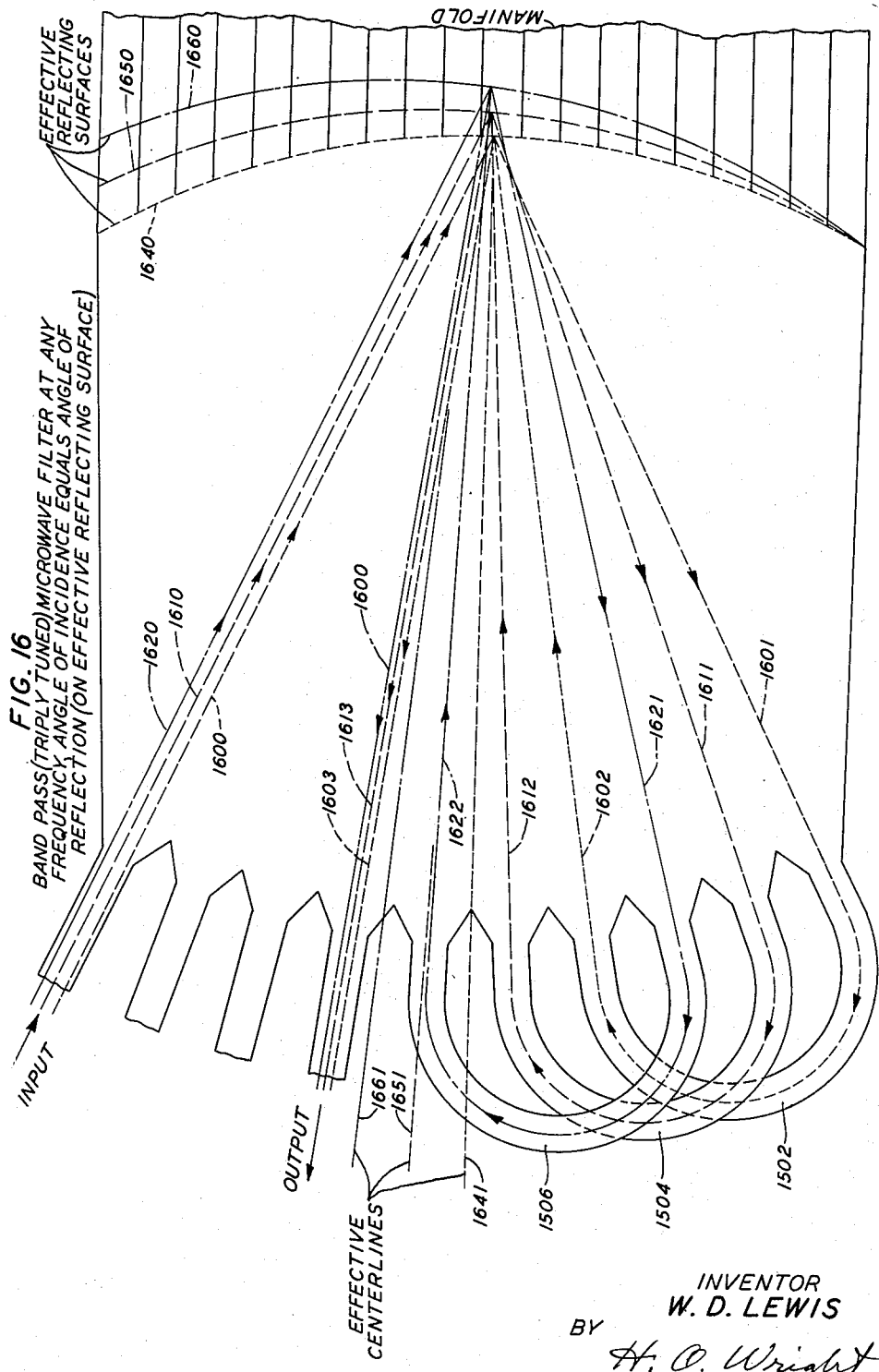

Dec. 22, 1953   W. D. LEWIS   2,663,848
ELECTROMAGNETIC WAVE MICROWAVE FREQUENCY FILTER
Filed Feb. 21, 1951   11 Sheets-Sheet 10
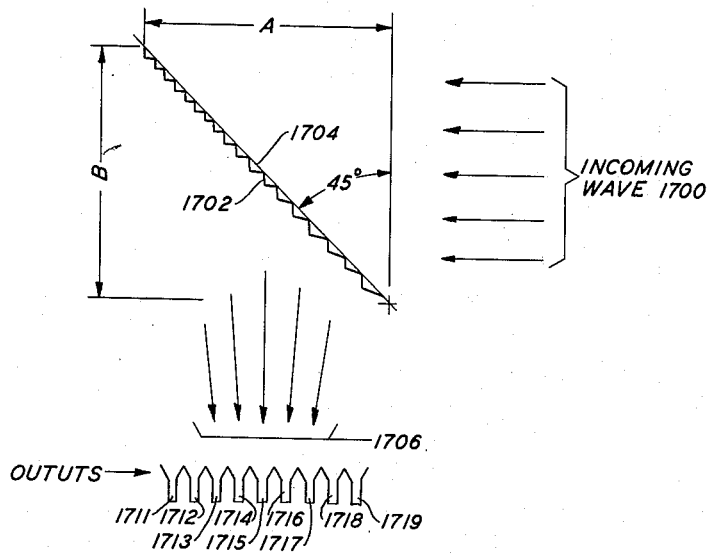
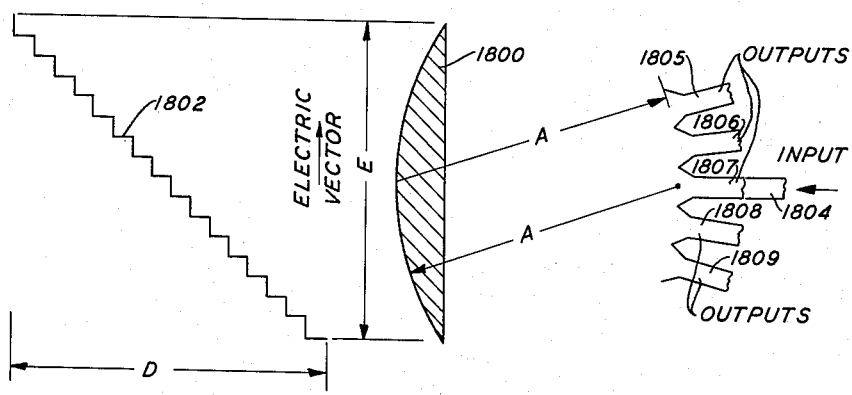
INVENTOR
W. D. LEWIS
BY
H. O. Wright
ATTORNEY Dec. 22, 1953      W. D. LEWIS      2,663,848

ELECTROMAGNETIC WAVE MICROWAVE FREQUENCY FILTER

Filed Feb. 21, 1951      11 Sheets-Sheet 11

INVENTOR
*W. D. LEWIS*
BY
*H. O. Wright*
ATTORNEY

Patented Dec. 22, 1953

2,663,848

UNITED STATES PATENT OFFICE 2,663,848

ELECTROMAGNETIC WAVE MICROWAVE FREQUENCY FILTER

Willard D. Lewis, Little Silver, N. J., assignor to Bell Telephone Laboratories, Incorporated, New York, N. Y., a corporation of New York Application February 21, 1951, Serial No. 212,129

5 Claims. (Cl. 333—73)

This invention relates to novel electromagnetic wave filters for use at very high or "microwave" frequencies. More particularly it relates to novel microwave frequency, electromagnetic wave, filters in which refracting or diffracting microwave frequency structures are employed in combination with terminal microwave frequency arrangements, which combinations serve, for example, to effect the separation of the several frequency bands of a multichannel radio microwave frequency system.

Optical prisms and gratings, classed generically as spectroscopes, are well known to those skilled in the optical art and are known to effect the separation in space of a composite light beam into regularly arranged bands of differing wavelength (color) or frequency. Somewhat analogous effects can be obtained at microwave radio frequencies, but to obtain structures of practicable physical dimensions it will not suffice to simply scale up known optical spectroscopes, since these usually have dimensions which are in the order of hundreds of thousands or even millions of wavelengths. Furthermore, suitable terminal arrangements for electromagnetic wave microwave frequency systems, which differ markedly from the terminal arrangements for optical devices, are required, as will become apparent hereinafter.

At microwave electromagnetic wave or radio frequencies (i. e. frequencies above, say 100 megacycles) refracting or diffracting materials and/or structures can be employed which change their transmitting characteristics rapidly with frequency and thus structures of practicable physical dimensions can be obtained.

A principal object of the invention is, therefore, to provide novel electromagnetic wave structures for use at microwave radio frequencies which will effect the physical and electrical separation of a broad band of frequencies into a plurality of discrete subportions or frequency channels, each of which subportions is suitable for a communication channel to transmit, for example, a television program "video" signal or a group of carrier telephone or telegraph channels.

A further object is to provide novel types of microwave radio wave filtering devices.

Other and further objects will become apparent during the course of the following detailed description and from the appended claims.

The principles of the invention will be more readily understood from the following description of specific illustrative embodiments shown in the accompanying drawings in which:

Figs. 6A and 6B are plan and side views respectively of one specific example of a filter of the invention;

Fig. 7 is a further specific example of a filter structure of the invention involving double utilization of substantial portions of the structure;

Fig. 8 shows phase-versus-frequency characteristics employed in explaining particular filter structures of the invention.

Fig. 9 shows improved amplitude-versus-frequency characteristics which can be obtained by specific structures of the invention;

Figs. 13 and 14 show specific composite or conjugate filter structures of the invention;

Fig. 15 illustrates a way of further increasing the utilization of substantial portions of a specific filter structure of the invention;

Fig. 16 is a diagram employed in explaining the operation of the device of Fig. 15;

Fig. 17 is an electromagnetic wave filter of the invention for use at extremely high frequencies;

Figs. 18A and 18B are top and side views of a filter of the invention for use at extremely high frequencies in which the double utilization of substantial portions of the structure is effected.

Figure 1:
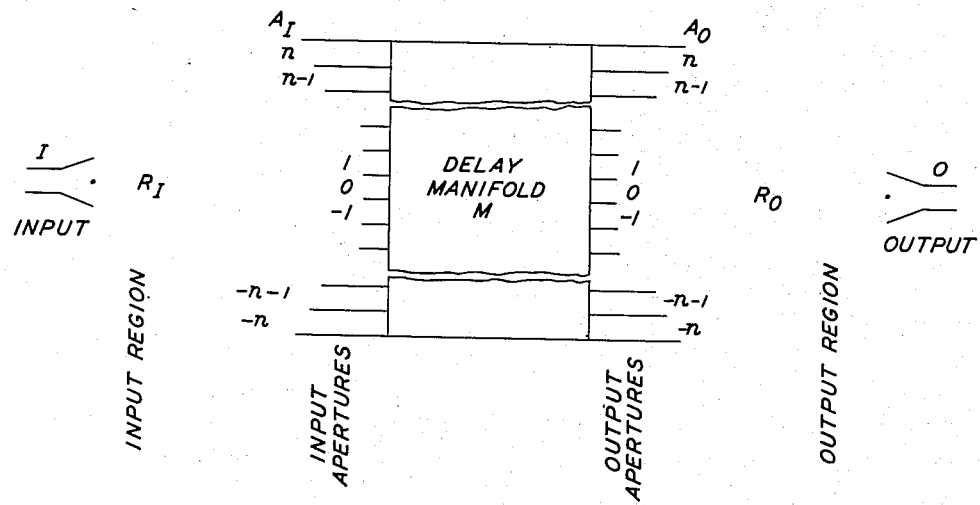
Fig. 1 is a diagrammatic showing of certain fundamental features of a prototype electromagnetic microwave filter of the invention.

In the first category of electromagnetic wave microwave filters of the invention, to be discussed, principles somewhat analogous to those familiar in the optical region are employed but these principles are implemented by means particularly adaptable to and available in the electromagnetic wave microwave art, especially antenna techniques, wave-guide techniques, and parallel plate techniques. By these means a broad electromagnetic wave microwave frequency spectrum may be separated into a number of component and narrower spectra, but only with substantially the degree of resolution available with singly resonant branching filters in the more familiar low-frequency, lumped-element electrical wave filter art.

In the second category to be discussed, structures very similar to those in the first category are employed but the phase characteristics of the frequency-sensitive paths are so controlled as to make available more general forms of response with frequency and consequently more efficient exploitation of the frequency space.

In the third category of electromagnetic wave microwave filters to be discusssed, a new technique is described by means of which this more efficient exploitation of frequency space can be obtained directly by methods which do not rely upon special control of phase characteristics.

A microwave filter of the present invention may be defined as a filter which achieves discrimination in frequency by the following process; any wave entering the input is directed by an input section into a plurality of separate paths, these paths differ in their respective variations of phase with changing frequency, the wave components are combined again after passing through their respective separate paths by an output section and directed into one or several outputs, and the frequency dependent phase differences of the components in each output result in a frequency dependent amplitude difference or discrimination in that output.

Microwave filters of the present invention differ from those previously devised for use at microwave frequencies not only in the general structural arrangement but also in that they involve input and output sections in which input and output regions, respectively, are situated. These regions can be unenclosed or they can be contained between parallel plates. Throughout the input and output regions propagation can take place under fewer constraints than in the more conventional wave guides, coaxial lines and similar structures of the prior microwave art. Many modes of propagation can exist in some of the forms taken by these input and output regions.

Microwave filters of the present invention are of particular interest as the frequency is increased (and the wavelength is, of course, correspondingly decreased) for at frequencies so high that the known prior art types of microwave filter structures become of impracticably small physical dimensions, suitable microwave filters of the present invention, of practicable physical dimensions, can still be readily constructed.

(a) *Determination of conditions for no loss through one form of a microwave filter of the invention*

Let us examine the transmission through a prototype filter of the invention as illustrated in diagrammatic form in Fig. 1. In the diagrammatic presentation of Fig. 1, the device I represents an input device, such as a sectoral horn or a metal lens antenna of the type described by W. E. Kock in the Proceedings of the Institute of Radio Engineers, for November 1946, volume 34 at pages 828 to 836, inclusive, or the like, adapted to spread microwave energy with subtantial uniformity (or in accordance with some predetermined form of distribution such, for example, as a sinusoidal law of distribution) over a predetermined area, on an opposite boundary of which area, a plurality of apertures, to be described presently, are situated.

In Fig. 1, the device M represents a delay manifold which comprises a plurality of paths for the transmission of the microwave energy introduced from input device I. Each of said plurality of paths has an input aperture at the left side of maniold M and an output aperture at the right side of aperture M, the two groups of apertures being designated generally at $A_I$ (input) and $A_O$ (output), as illustrated. Designating the central aperture of each group ($A_I$ and $A_O$, respectively), as 0 and apertures above the aperture 0, as 1, 2, 3, ... $n-1$, $n$ and those below aperture 0, as $-1$, $-2$, $-3$, ... $-n-1$, $-n$, a general form of manifold having $2n+1$ input apertures and the same number of output apertures, symetrically arranged in the vertical plane, is obtained.

The group of output apertures $A_O$ are arranged to direct energy emerging from them into the output device O, which can be the counterpart of input device I, but which of course functions to collect all components of the energy from all of the output apertures $A_O$ and to deliver the sum total of these components to a single output channel. As will become apparent during the course of the following description, several output devices can be substituted for a single output device and each of the output devices can then be positioned and arranged to collect only particular components of the total energy emerging from the group of output apertures $A_O$ whereby the total energy will be subdivided among the several output devices, energy falling within particular different predetermined frequency bands being, in effect, directed to particular different output devices. In general, the selectivity of the several output devices will be a result of the relative phase-versus-frequency relations existing between the numerous components which impinge upon each particular output device.

The region between input device I and manifold M, designated $R_I$ in Fig. 1, is the "input region" and that between manifold M and output device O, designated $R_O$ in Fig. 1, is the "output region" of the over-all combination shown in Fig. 1. The sections of the filter within which these two regions are located are known as the input and the output sections, respectively.

For the purpose of mathematical analysis the arrangement illustrated diagrammatically in Fig. 1, and involving only a single output device, will first be considered.

Energy incident at input I is fed through input region or section $R_I$ and distributed into the $2n+1$ input apertures $A_I$, where $n$ is an integer. (The number of apertures is taken as odd to facilitate later mathematical development. It would be equally valid to choose an even number, and any integer, even or odd, can be used in practice in the design of a microwave filter of the invention.)

The energy, divided into these $2n+1$ separate paths, travels through them from each input aperture to the corresponding output aperture, then through the output region or section $R_O$.

Let us evaluate the fraction of the total energy which will flow into the output device O.

Let the input device I be assumed to be a distributing feed, for example, assume it is similar to the feed of a microwave antenna, which distributes power to the $2n+1$ separate input apertures, numbered, $-n, -(n-1), \ldots -2, -1, 0, 1, 2, \ldots (n-1), n$. Let the total input power be designated by P, and let the corresponding power which appears in the $s$'th input aperture be designated by $P_s$. Let us designate the corresponding quantities for the output device O and the $s$'th output aperture by $P'$ and $P_s'$, respectively. We define these in the same way, i. e., for $P'$ incident in the output we would observe $P_s'$ in the $s$'th output aperture, however, for power flow in the direction we are considering, this means, by the law of reciprocity, that if there is power $P_s'$ in the $s$'th output aperture flowing towards the output, then, in the absence of other waves, that $P_s'$ will appear in the output. We are now in a position to compute the transmission from input to output.

Let V be the voltage at the inputs and $\phi_s$ the phase of the total path from input to output through the $s$'th path. Then the voltage magnitude into the $s$'th aperture is given by, $$V\sqrt{\frac{P_s}{P}} \quad (a.1)$$

and the resulting voltage magnitude from this into the output is $$V\sqrt{\frac{P_s P_s'}{P P'}} \quad (a.2)$$

so that the total voltage into the output is given by $$V = \sum_{s=-n}^{s=n} \sqrt{\frac{P_s P_s'}{P P'}} \epsilon^{i\phi_s} \quad (a.3)$$

In other words, the effect of transmission through the filter is represented by the factor:

$$\sum_{s=-n}^{s=n} \sqrt{\frac{P_s P_s'}{P P'}} \epsilon^{i\phi_s} \quad (a.4)$$

The condition for no loss is that the magnitude of this factor ($a.4$) be equal to 1. This will occur if, and only if, $$\sum_{s=-n}^{s=n} P_s = P \quad \sum_{s=-n}^{s=n} P_s' = P' \quad (a.5)$$

$P_s = P_s'$ for all $s$, and $\phi_s = \phi$ for all $s$.

These conditions for no loss may be stated verbally, as follows:

(1) All energy from the input feed must strike the input apertures. By reciprocity the energy entering the output feed must be the sum total of all the energy emerging from the output apertures.

(2) The distribution function between the input device and the input apertures must correspond to the distribution function between the output device and the output apertures.

(3) There must be no ohmic or reflection losses.

(4) The phase of all paths between input and output must be, effectively, equal (we must remember in this connection that the addition or subtraction of an integral number of wavelengths, i. e., of multiples of $2\pi$ to the phase, leaves it, effectively, unchanged).

Any departure from the above conditions in a practical microwave filter of the invention will result in some loss.

(b) *Determination in a particular case of the variation of amplitude with frequency in a microwave filter of the invention*

Figure 2:
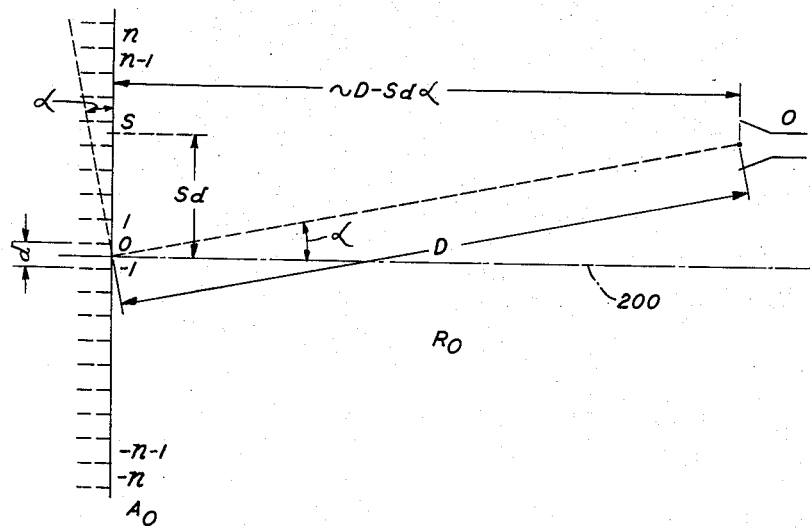
Fig. 2 is a diagrammatic showing of an idealized output region of a filter of the invention.

Let us begin by considering a somewhat idealized output region, or section, $R_o$, as illustrated diagrammatically in Fig. 2. The output section illustrated diagrammatically in Fig. 2 is substantially the same as that of Fig. 1 between the row of output orifices $A_o$ and the output device O, except that in Fig. 2, output device O is displaced from the normal 200 to the "0" aperture, as shown. The row of $2n+1$ output apertures $A_o$, is placed along a straight line at intervals $d$, center to center, between adjacent apertures and the output is placed at a large distance D from the center aperture at an angle $\alpha$ from the normal 200 to the line of apertures. The distance of output device O from the $s$'th aperture is readily seen to be approximately $D - sd\alpha$. Let the phase of the component due to the $s$'th aperture be $$\phi_s = \phi + sk\Delta f \quad (b.0)$$

where $\Delta f = f - f_0$ and $f_0$ is some reference frequency, i. e., let it be a constant plus a linear variation with frequency proportional to the position of the aperture in the line. Let the amplitude at the output due to the wave in the $s$'th aperture be proportional to $\cos \delta_s$ where $\delta$ is a small angle, i. e., let the amplitude across the apertures have a slow variation with a maximum at the center aperture. The voltage in the output will be given by summing the individual voltage components, i. e. this voltage will be proportional to $$\sum_{s=-n}^{s=n} \cos \delta_s \epsilon^{i\left[(\phi + sk\Delta f) + \frac{2\pi}{\lambda}(D - sd\alpha)\right]} =$$
$$\epsilon^{i\left[\phi + \frac{2\pi D}{\lambda}\right]} \sum_{s=-n}^{s=n} \cos \delta_s \epsilon^{is\left[k\Delta f - \frac{2\pi}{\lambda}d\alpha\right]} \quad (b.1)$$

The external phase factor does not affect the magnitude of this sum. The sum can be evaluated by means of conventional mathematical methods and has the value $$\frac{1}{2}\left[\frac{\sin\frac{2n+1}{2}(X+\delta)}{\sin\frac{1}{2}(X+\delta)} + \frac{\sin\frac{2n+1}{2}(X-\delta)}{\sin\frac{1}{2}(X-\delta)}\right] \quad (b.2)$$

where $$X = \left[k\Delta f - \frac{2\pi}{\lambda}d\alpha\right]$$

This expression has a maximum when $X = 0$ or when $$\alpha = \frac{k\Delta f \lambda}{2\pi d} = \frac{\Delta f}{f}\frac{kc}{2\pi d} \quad (b.3)$$

We see, therefore, that the power in the output will be a maximum at an angle which depends upon frequency. This angle $=0$ when $\Delta f = 0$ and where $$\frac{\Delta f}{f} \ll 1$$

varies approximately linearly with frequency. It follows that a succession of outputs at various angles can be used to divide up the band of frequencies in the neighborhood of $f_0$ into a number of component bands.

The quantity $\delta$ determines the amplitude taper across the aperture. If $\delta=0$, there is no taper and the above function reduces to $$\frac{\sin\frac{2n+1}{2}X}{\sin X} \qquad (b.4)$$

which in the vicinity of $X=0$ is approximately equal to $$\approx (2n+1)\frac{\sin Y}{Y}$$

where $$Y = (2n+1)X$$

This is a function very familiar to those skilled in the antenna art. It is plotted, in Fig. 3, as curve 10.

If $(2n+1)\delta=\pi$, there is an effective cosine amplitude taper across the output apertures and the above function reduces, approximately, to $$\left(\frac{2n+1}{2}\right)\left[\frac{\sin\left(Y+\frac{\pi}{2}\right)}{\left(Y+\frac{\pi}{2}\right)}+\frac{\sin\left(Y-\frac{\pi}{2}\right)}{\left(Y-\frac{\pi}{2}\right)}\right] \qquad (b.5)$$

Figure 3:
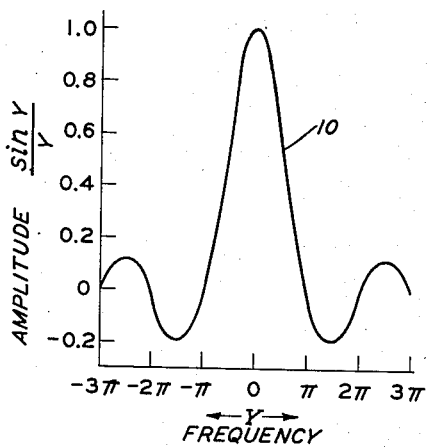
Fig. 3 is a frequency-versus-amplitude transmission characteristic for a filter of the invention.
Figure 4:
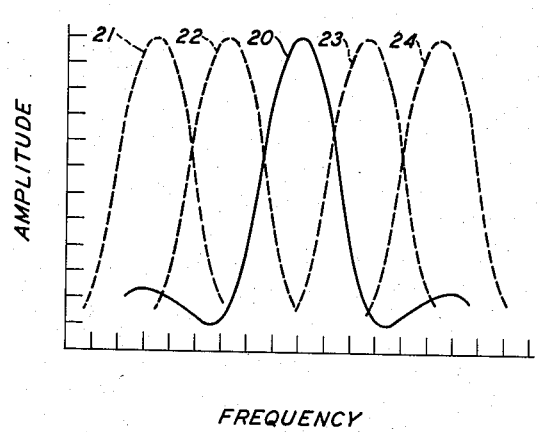
Fig. 4 is a group of characteristics for a group of filters of the invention passing adjacent frequency bands.

This function is plotted as the solid curve 20 in Fig. 4 and is seen to have a somewhat broader main lobe and smaller subsidiary lobes than the prior above-described function plotted as curve 10 of Fig. 3.

In order to achieve frequency discrimination by means of a microwave filter of the invention with an output curve 10 or 20 as shown in Fig. 3 or 4, respectively, we merely need to employ a number of outputs displaced in angle so that their maximum responses are satisfactorily displaced in frequency. The responses in the various additional outputs can then be, for example, as indicated by curves 21 to 24, inclusive, in Fig. 4.

The basic principles of the simplest microwave filters of the present invention have been discussed above. Many other forms of structures and of amplitude tapering involving the use of these principles will readily occur to those skilled in the art. More complex microwave filters of the present invention will be described hereinunder.

(c) *Delay method of generating proper phase dependence on frequency*

In the previous section, we assumed that the phase in the component due to the $s$'th aperture in a microwave filter of the invention was equal to $\phi+sk\Delta f$, where $\Delta f=f-f_0$, and $f_0$ is some reference frequency. In other words, we assumed that over the band of the filter, the phase varied approximately linearly with frequency. This is always true in grating-type optical spectroscopes and can be realized in a large class of somewhat analogous microwave filter structures. We shall see, however, in a later section, that departing from this condition makes possible further classes of microwave filters of the invention.

It is well known to those skilled in the low-frequency, lumped-element electrical network and circuit art, that a linear phase variation over a predetermined range of frequency can be obtained by inserting a network or a transmission line which has a constant delay throughout the predetermined frequency range. Let us assume that the phase characteristic of the component due to the $s$'th aperture is obtained by inserting (or effectively inserting) a transmission line of length $l_s$. This line may be embodied as a free space path, a path between parallel plates, a coaxial line, or a wave guide. (In a wave guide, the delay is, of course, not perfectly constant; but in the normal range of use, it varies little enough so that the same general considerations may be applied, to a good approximation.)

The wavelength in any of the cases listed above may be written in the form $$\lambda_g = \frac{\lambda}{\sqrt{1-\left(\frac{\lambda}{\lambda_c}\right)^2}} \qquad (c.1)$$

where $\lambda_c$ is the "cut-off frequency" wavelength ($\lambda_c=\infty$ for free space or coaxial line). The phase due to the insertion of a length of line is therefore $$\phi_s = \frac{2\pi L_s}{\lambda_g}$$

If we use Taylor's Theorem to expand this about a frequency $f_0$, we find $$\phi_s = \frac{2\pi L_s}{\lambda_{g0}} + (f-f_0)2\pi L_s \frac{d}{df}\frac{1}{\lambda_g} = \frac{2\pi L_s}{c}\left[\frac{f_0}{\mu}+\mu\Delta f\right] \qquad (c.2)$$

where $$\mu = \frac{1}{\sqrt{1-\left(\frac{\lambda}{\lambda_c}\right)^2}} = \frac{1}{\sqrt{1-\left(\frac{f_c}{f}\right)^2}} \geq 1$$

$c=$ velocity of light.

(d) *Design of the delay manifold*

In section (b) we assumed that the phase of the component due to the $s$'th aperture was $$\phi_s = \phi + sk\Delta f \qquad (b.0)$$

The results of the previous section show that in order to obtain this result we can choose the effective length of the path which produces this phase as $$L_s = L + sL_d \qquad (d.0)$$

This is equivalent to saying that the manifold is constructed of an assembly of lines each one of which is $L_d$ longer than its neighbor on one side and $L_d$ shorter than its neighbor on the other side From Equation c.2 we found that $$\phi_s = \frac{2\pi L_s}{c}\left[\frac{f_0}{\mu}+\mu\Delta f\right] \qquad (c.2)$$

from which it follows that $$\phi_s = \frac{2\pi(L+sL_d)}{c}\frac{f_0}{\mu}+\frac{2\pi(L+sL_d)}{c}\mu\Delta f \qquad (d.1)$$

In this expression we can set $$\phi = \frac{2\pi(L+sL_d)}{c}\frac{f_0}{\mu}+\frac{2\pi L}{c}\mu\Delta f \qquad (d.2)$$

by requiring that $$\frac{2\pi L_d s}{c}$$

is an integral multiple of $2\pi$.

The term in this equation which contains the product $s\Delta f$ is then the only one which must be included in the summation b.1. This is $$\frac{2\pi s L_d}{c}\mu\Delta f$$

and can be set equal to $ks\Delta f$ of b.0. It follows that $$k = \mu\frac{2\pi}{c}L_d \qquad (d.3)$$

It follows also, from b.3 that the direction of maximum radiation is given by $$\alpha = \frac{\Delta f}{f} \cdot \frac{c}{2\pi d} \cdot k = \frac{\Delta f}{f} \cdot \frac{c}{2\pi d} \cdot \frac{\mu \cdot 2\pi L_d}{c}$$

i. e. that $$\alpha = \frac{\Delta f}{f} \frac{L_d}{d} \mu \qquad (d.4)$$

From the foregoing discussion we know that in this equation $\alpha$ is the angle, in radians, of the direction of maximum output from the delay manifold at reference frequency, $L_d$ is the length by which each line of the delay manifold is successively different from its neighbor, $d$ is the center-to-center spacing of the output manifold and $\mu$ is the quantity $$1/\sqrt{1 - \left(\frac{f_c}{f}\right)^2}$$

where $f_c$ is the cut-off frequency in the manifold lines.

The above equation gives us a good deal of design information concerning the delay manifold. In applying it we must recall that delays and phase changes due to the input and output regions or sections must be added to those in the lines connecting the input and output apertures. The methods of applying these equations will be illustrated after we have extended our theoretical treatment to some other relevant matters.

(e) *Illustrative design of one form of microwave filter of the invention*

In the idealized output region of Fig. 2, it was assumed that the distance D was large with respect to the other dimensions. This made possible a simplification of the mathematics; but if D is made too large, it would result, in practice, in a physically impractical device. It can be shown, however, that if D is made a length comparable to the length of the row of output apertures that approximately the same mathematics will apply, provided due allowance is made for fixed differences in phase.

Figure 5:
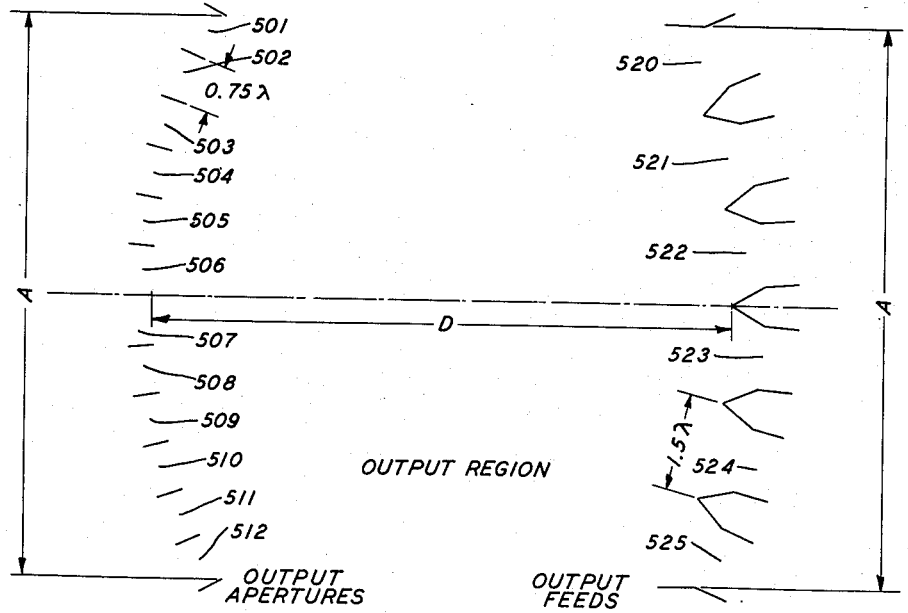
Fig. 5 shows in diagrammatic form a specific configuration for the output region of a filter of the invention.

By way of illustration, in the diagram of Fig. 5, a row of output apertures 501 to 512, inclusive, of a manifold (not shown in Fig. 5) are arranged on an arc, the center of curvature of which is centrally located on a corresponding arc on which output feed devices 520 to 525, inclusive, are located. Conversely, the center of curvature of the arc on which device 520 to 525, inclusive, are located is centrally located on the first-mentioned arc locus of the apertures. The length (vertically) of each row is A, and the separation between the center points of the two above-described arcs is D.

Let us confine the output section to the region between two conducting parallel plates. In particular, we can, as described above, place the output apertures along the arc of a circle with its center of curvature at the junction of output feed devices 522 and 523, as shown in Fig. 5. All the output feed devices can be placed along the arc of a circle with its center of curvature at the junction of the central output apertures 506 and 507. This configuration will follow the above mathematical treatment particularly closely.

Let us now assume that we wish to obtain $m$ channels spaced $\Delta_0 f$ center-to-center, where $m\Delta_0 f$ is small compared to the reference frequency $f_0$. Then, by Equation d.4, the angular separation between successive output feed devices must be $$\alpha_0 = \frac{\Delta_0 f}{f} \frac{L_d}{d} \mu \qquad (e.1)$$

It follows that the center-to-center distance between feed devices must be $$\alpha_0 D = \frac{\Delta_0 f}{f} \frac{L_d}{d} \mu D \qquad (e.2)$$

In order to obtain a reasonably compact shape for the output region, we can, in Fig. 5 make D of the same order of magnitude as A. Stated mathematically, a value of $$D \cong A \qquad (e.3)$$

is, therefore, a possible choice. The aperture array will therefore subtend an angle of approximately one radian, or say 60 degrees, at each output feed device.

In order to avoid "spillover" losses (item 1, section a) the output feeds must be so designed that their radiation patterns fall almost entirely on the aperture array. From elementary antenna theory we see that this will occur if the feed has dimensions of about $1.5\lambda$.

Let us place the output horns contiguously so that the total arc length occupied by them is a minimum and is equal to $1.5 m\lambda$. Let us make the total arc length occupied by these horns equal to the arc length of the array of apertures so that $$A \cong 1.5 m\lambda \qquad (e.4)$$

Combining e.2, e.3, and e.4 we obtain $$\frac{L_d}{d} = \frac{f}{\Delta_0 f} \cdot \frac{1}{\mu} \cdot \frac{1}{m} \qquad (e.5)$$

which fixes $L_d/d$.

If we make $d$ too large, $L_d$ will become too large, the directivity of the output apertures will become too great and, worst of all, we run the risk of obtaining spurious principal maxima in expressions of the type b.2. On the other hand if we make $d$ too small many extra individual output apertures with an associated delay line for each one will be required and the filter will become unnecessarily complex. Simple antenna theory can be used to show that for an output region of the proportions illustrated in Fig. 5, a value of $d$ between $0.5\lambda$ and $\lambda$ will produce a practicable structure which will operate satisfactorily. Let us assume, for example, $$d = 0.75\lambda$$

It now follows from e.5 that $$L_d = \frac{0.75\lambda f}{\Delta_0 f} \cdot \frac{1}{\mu} \frac{1}{m} = \frac{0.75c}{m\Delta_0 f} \frac{1}{\mu} = \frac{0.75}{\mu} \frac{c}{F} \text{ or } L_d = \frac{0.75\lambda^*}{\mu} \qquad (e.6)$$

Here, F is a frequency equal to the total frequency range handled by the filter, and $\lambda^*$ is the wavelength corresponding to this frequency.

The objective of this section has been reached. It has been shown that we can build a microwave filter of the invention in which the parallel plate output region or section is substantially square and has, in the plane of the manifold, two dimensions of about $1.5 m\lambda$ each, where $m$ is the number of outputs and where there are $2m$ separate delay lines differing in length by $$L_d = \frac{0.75\lambda^*}{\mu}$$

(f) *Additional illustrative configurations*

In the foregoing section (e), we employ the theory developed in the previous sections (a) to (d), inclusive, to show how the parameters of a microwave filter of the invention might be chosen when some of its performance requirements are specified. From the curves of Fig. 4, we see that flatter-topped and steeper-sided amplitude-versus-frequency characteristics than those obtainable at relatively low frequencies by singly resonant circuits in ordinary lumped-element circuit filter technique cannot be expected from this elementary microwave filter technique. On the other hand, where the total frequency range to be handled is not too large a fraction of the midband frequency and where a number of approximately evenly spaced output channels are required, it is quite easy to specify an output region or section and a delay manifold consisting of transmission lines which will be adequate to produce the desired performance.

It cannot be emphasized too strongly that the particular dimensions employed in the previous section and in connection with Fig. 5 are for the sake of illustration only. Many other relative values of dimensions and many substantially different configurations can be employed which will embody the same general principles of the invention. Some of the large number of possible variations will be discussed below by way of further illustration.

The particular dimensions indicated in the previous section (e) and in Fig. 5, though not absolutely minimum, are in the smaller practical ranges. As the frequency is increased and the wavelength becomes smaller, it will obviously become advantageous to use dimensions which are larger in terms of the wavelength. The dimensions suggested in connection with Fig. 5 can, for example, be increased in several ways.

(a) The output feed devices can be increased in size provided that the distance D is increased in proportion. (This is permissible since this does not alter the angular position occupied by each feed and, at the same time, increases its linear dimensions so that its illumination pattern remains confined principally to the aperture array.)

(b) The apertures and consequently the aperture array can be increased in size provided that the distance D is increased in proportion. (As this is done, the rate of change of angular deviation with frequency is decreased in exact proportion to the decreased angles of the output devices or horns.)

(c) Any desired combination of (a) and (b), above, can be employed. By way of a particular example, if both are increased in the same proportion, the quantity D must be increased in proportion to the square of the factor of increase. In general, D must be increased in proportion to the product of the two factors of increase.

Throughout the above discussion, no mention has been made of the distance separating the parallel plates of the output region. Where the electrical vector is perpendicular to the conducting plates so that the transverse electromagnetic mode only is present, this distance can, in theory, be anything. If it is made too small, excessive ohmic loss will result. If it is made greater than one-half wavelength, undesired modes can be propagated and must be guarded against. Modes other than the transverse electromagnetic may be used in this region provided that the output feed devices or horns and the apertures are designed appropriately, in accordance with principles well understood by those skilled in the art.

The parallel plates may be omitted without changing the fundamental principles of operation. In this case, some other means of employing substantially two-dimensional energy transmission in a three-dimensional region can be used (c. f. many cylindrical microwave antennas. For example, a large cylindrical antenna is illustrated in Fig. 26 at page 262 of the paper "Radar Antennas" by H. T. Friis and W. D. Lewis, Bell System Technical Journal, vol 26, No. 2 for April 1947. This antenna, obviously, would be of reasonably small dimensions if scaled to a frequency of 50,000 megacycles or higher.)

Of more importance, perhaps, is the case where the delay manifold itself is omitted and the input and output regions are so arranged that the distances involved from input feed to apertures to output feed provide in themselves the proper delays to give the desired effects. This, broadly speaking, is the principle of optical grating spectroscopes now in use.

Another important case is where a dispersive region (one whose phase characteristics vary with frequency) is shaped into a prism and used as the delay manifold. This is analogous to the prism spectroscope of optics. These techniques become important and practical as soon as the wavelength becomes so short that techniques approximating optical techniques can be said to be applicable. In the foregoing, we have omitted a detailed discussion of the input region because none seems to be necessary. We can use any means of distributing the input power as desired among the various lines or regions of the delay manifold. In particular, we can employ a waveguide manifold or we can employ an open region in a manner similar to that suggested in connection with the output region. We can in some designs, illustrative examples of which will be described in detail hereinafter, employ a region which is coincident with the output region.

A number of illustrative embodiments of the above-mentioned principles, structures, and techniques will be provided below.

In Figs. 6A and 6B a straightforward application of many of the principles described above, is shown in the form of a specific design of a microwave filter of the invention proportioned to operate over the frequency region between 45,000 megacycles to 55,000 megacycles, inclusive.

Fig. 6A is a top view, and Fig. 6B is a side view of the microwave filter. Device 600, as shown in Fig. 6A, is an input device comprising an electromagnetic horn, the throat section, or left end, of which is a section of wave guide of rectangular cross section having inside dimensions of $\frac{3}{8}$ inch by $\frac{3}{16}$ inch, the larger dimension appearing in Fig. 6A. The right end of horn 600 has a flare in the plane of the paper, Fig. 6A, such that continued, as sides 632 and 634 of the input section, they meet the outermost sides 642 and 644, respectively, of the delay manifold and the output section both of which last two mentioned portions will be described in detail presently. The longitudinal axis of horn 600 is coincident with the longitudinal axis or center line 601 of the entire structure.

The enclosure of the input region 630 is completed by parallel plates 636, 638, shown as top and bottom boundaries of the region, in Fig. 6B. The distance between plates 636 and 638 is $\frac{3}{16}$ inch, internal dimension.

The delay manifold M comprises 20 lengths of wave guide designated 601 to 620, inclusive, respectively, each wave guide being of rectangular cross section and having internal cross-sectional dimensions of $\frac{3}{32}$ inch by $\frac{3}{16}$ inch, the $\frac{3}{32}$ inch dimension (top) being shown in Fig. 6A and the $\frac{3}{16}$ inch dimension (side) being shown in Fig. 6B.

The shortest wave guide 601 is made approximately two inches long and includes only a small loop, if any. Each higher numbered wave guide is approximately 1.3 inches longer than the next lower numbered wave guide. The precise lengths of all the wave guides are chosen so that the energy components emerging from the right ends of all the guides are exactly in phase at the mid-frequency, 50,000 megacycles, of the band in which the filter is designed to operate, namely 45,000 to 55,000 megacycles, inclusive.

As indicated in Fig. 6A the left ends of the guides 601 to 620, inclusive, constitute the input apertures of the manifold M and are arranged on an arc having a radius of 3¾ inches, the center of curvature of which is the mid-point of the output end (right) of input device 600. Similarly the right ends of the guides 601 to 620, inclusive, constitute the output apertures of the delay manifold M and are also arranged on an arc having a radius of 3¾ inches, the center of curvature being the center point of the arc upon which the output devices 650 to 659, inclusive, are arranged.

The width of the manifold M and the output region 640 are both 3¾ inches as shown in Fig. 6A.

The output devices or horns 650 to 659, inclusive, are similar to the input device 600, but only the lower side of device 650 and the upper side of device 659, as shown in Fig. 6A, are extended to the sides 642 and 644, respectively, of the delay manifold M. The other sides of devices 650 to 659, inclusive, are merely extended until they join those of the next adjacent device on each side as shown in Fig. 6A. Top and bottom parallel plates 646 and 648, as shown in Fig. 6B, complete the enclosure of output region 640, the distance between the plates 646 and 648 being 3/16 inch. The output devices 650 to 659, inclusive, are also arranged on an arc having a radius of 3¾ inches as shown in Fig. 6A, the center of curvature of which arc is the center point of the above-described arc upon which the output apertures of delay manifold M are located.

The over-all filter of Figs. 6A and 6B should be constructed of highly conductive material such as silver or copper. Sheet material 3/16 inch thick is suitable. Alternatively, to conserve in the use of an expensive material such as silver, a plastic, wooden or base metal structure of the required dimensions, having its inner surfaces plated or "veneered" with the more expensive material can be used. In many structures, for example, "plywood" sheet material the appropriate surfaces of which are painted with metallic paint or covered with thin sheet copper, or the like, are employed.

The filter of Figs. 6A and 6B serves to divide the frequency region between 45,000 and 55,000 megacycles into ten bands, each, approximately, 1,000 megacycles in width, the ten bands being centered about the frequencies, 45,500, 46,500, 47,500, 48,500, 49,500, 50,500, 51,500, 52,500, 53,500 and 54,500 megacycles for the output devices 650 to 659, respectively, as indicated in Fig. 6A.

In Fig. 7 a modification of the form of the filter of Figs. 6A and 6B is shown, in which the input and output regions are consolidated into a single "duplex" region employed for both purposes and the wave-guide delay manifold comprises 20 sections of wave guide 701 to 720, inclusive, which are short-circuited at their respective ends which are remote from the "duplex" region, as shown.

The input aperture 799 is, in this structure, the uppermost of the row of apertures of which the remaining apertures 730 to 738, inclusive, are output apertures for nine frequency bands of approximately 1,000 megacycles in width, the bands being centered about the frequencies 46,000, 47,000, 48,000, 49,000, 50,000, 51,000, 52,000, 53,000 and 54,000, respectively.

Since the waves travel from the apertures of the wave guides 701 to 720, inclusive, to the short-circuited right ends of each guide and are then reflected back to the apertures, the wave-guide lengths need be only substantially one half of the lengths required for the device of Figs. 6A and 6B. Likewise the increase in length of each wave guide in the manifold with respect to the next shorter wave guide needs to be only one-half that employed with the device of Figs. 6A and 6B, namely 0.65 inch (instead of 1.30 inches). Otherwise the dimensions and general construction of the components can be substantially those shown for corresponding features of the device of Figs. 6A and 6B and described above. The lengths of wave guide comprising the manifold of the device of Fig. 7 are computed on the basis of producing the maximum response in the 50,000 megacycle output when the frequency of the input energy is also 50,000 megacycles.

The devices of Figs. 6A, 6B and 7, obviously, have physical dimensions throughout, which render them thoroughly practicable from the standpoint of actually constructing them, whereas structures of the prior art, for example, those comprising resonant cavities or chambers having critical dimensions which are in the order of a half wavelength, become impossible to construct, as a practical matter, when the frequencies to be employed are very high. For example, at a frequency of 50,000 megacycles, a wavelength is 6 millimeters and a half wavelength is 3 millimeters so that prior art devices employing resonant cavities or chambers cannot, as a practical matter, be readily maintained at the precise physical dimensions required.

Before proceeding to describe various combinations of the above embodiments further, we will discuss means whereby amplitude-versus-frequency characteristic with flatter tops and steeper sides can be provided by microwave filters of the invention.

(g) *More general characteristics through control of phase*

The delay manifolds discussed so far have been described as assemblies of simple transmission lines. These lines can, alternatively, be paths in free space, as in optical spectroscopes, or they can be paths between parallel conducting plates, or in specially designed coaxial lines or wave guides.

In any of these cases, the delay is constant or nearly constant as frequency varies, for which it follows that the amplitude-versus-frequency characteristics, as given, for example, by Formula b.2 and plotted in Figs. 3 and 4 will have rounded tops and relatively gradually sloping sides.

If a high percentage of the available frequency space is to be used in a microwave system employing several component bands, it may be necessary to employ filters whose amplitude-versus-frequency characteristics have flatter tops and steeper sides. In the prior microwave filter art, as in the classical low-frequency lumped-element filter art, such filter characteristics are obtained by employing more than one resonance for each channel filter to produce discrimination. An analogous procedure can be followed in designing microwave filters of the present invention. The significantly new factor, with respect to microwave filters of the invention, which is thus added is that of non-linear phase variation and the significantly new result which is obtained is that of flatter-topped, steeper-sided amplitude-versus-frequency characteristics.

The dotted line curve 800 in Fig. 8 represents the linear phase variation of a typical section of a line in a delay manifold which would produce the amplitude-versus-frequency characteristics plotted in Fig. 4. If by some means we can produce, at microwave frequencies, a phase-versus-frequency characteristic of the stepped type illustrated by the solid curve 802 of Fig. 8, and if structures made of sections of this type are employed to replace the lines in the manifold which produced the curves plotted in Fig. 4, the resulting amplitude-versus-frequency characteristics will be of the type illustrated by curves 900 to 904, inclusive, as plotted in Fig. 9. We see that these curves have flatter tops and stepper sides than the curves of Fig. 4.

The typical microwave line section to produce a phase characteristic of the type plotted as the solid line 802 of Fig. 8 can be regarded as the microwave equivalent of a low-frequency, lumped-element, all-pass network. Any type of all-pass network, or microwave equivalent thereof, with the required characteristics can in principle be used. Microwave equivalents of all-pass networks, are described in applicant's copending application Serial No. 789,985, filed December 5, 1947, which matured into United States Patent 2,531,447, granted November 28, 1950, and in the copending application of D. H. Ring, Serial No. 68,361, filed December 30, 1948, which matured into United States Patent 2,633,492, granted March 31, 1953.

Figure 10:
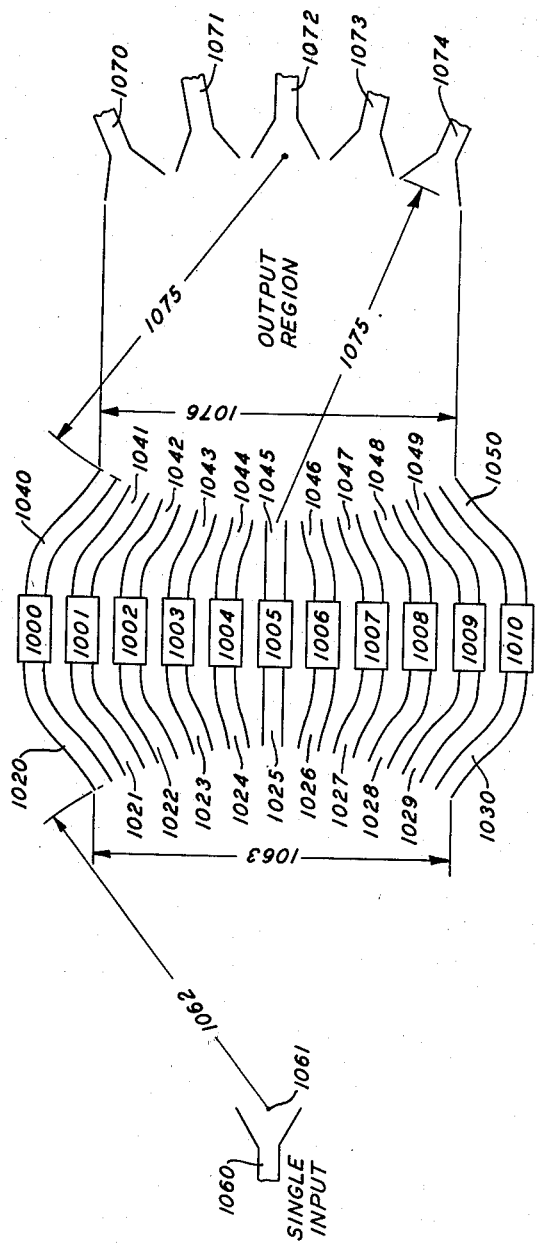
Fig. 10 illustrates a further specific form of filter of the invention incorporating more complicated devices in the delay manifold of the filter.

In the assembly of Fig. 10, one specific form for a microwave filter of the invention, employing a plurality of all-pass networks of the type disclosed and described in detail in the above-mentioned application of D. H. Ring, is shown.

In Fig. 10 blocks 1000 to 1010, inclusive, are microwave equivalents of all-pass networks according to D. H. Ring's abovementioned application, having phase characteristics of the type illustrated by curve 802 of Fig. 8 of the present application. Device 1060 is an input device which can be similar to the input device I of Fig. 1. The left ends of wave guides 1020 to 1030 inclusive constitute an array or row of input apertures similar to apertures A₁ of Fig. 1 but arranged on an arc having a radius 1062, the center of curvature 1061 of which is the mid-point of the output aperture of input device 1060. Radius 1062 is preferably made approximately equal to the vertical height 1063 of the row of input apertures. The right ends of wave guides 1020 to 1030, inclusive, connect to the input terminals of microwave all-pass networks 1000 to 1010, inclusive, respectively.

The left ends of wave guides 1040 to 1050, inclusive, are connected to the output terminals of devices 1000 to 1010, inclusive, respectively. The right ends of wave guides 1040 to 1050, inclusive, constitute another array or row of apertures and their arrangement with respect to the five output devices 1070 to 1074, inclusive, is similar to that illustrated in Fig. 5 and described in connection with that figure, above. As for Fig. 5, in Fig. 10 the arc upon which the right ends of wave guides 1040 to 1050, inclusive, are located and the arc upon which the left ends of output devices 1070 to 1074, inclusive, are located have equal radii 1075 which are substantially equal to the vertical height 1076 of the array or row of apertures constituting the right ends of the wave guides. The center of curvature of each arc is the center point of the other arc. As stated above the over-all arrangement of Fig. 10 will divide a broad band frequency input into five narrow bands, having amplitude frequency characteristics as illustrated, for example, by curves 900 to 904, inclusive, of Fig. 9.

(h) *More general characteristics through conjugate combinations of simple microwave filters*

The method described in the previous section g of obtaining more general amplitude-versus-frequency characteristics in a microwave filter is applicable where appropriate all-pass networks can be constructed. However, the construction of an all-pass network, as so far understood in the microwave art, is generally analogous to the construction of a low-frequency lumped-element all-pass network. It requires the design of numerous devices having specified resonances in specified frequency relationships to each other. The difficulty of constructing and adjusting such structures increases to the point where they may become impracticable at extremely high frequencies, i. e., at very short wavelengths. Accordingly we can also well look for a purely "distributed circuit technique" for obtaining more general very high microwave frequency filter characteristics. One such technique will be described in this section.

Figure 11:
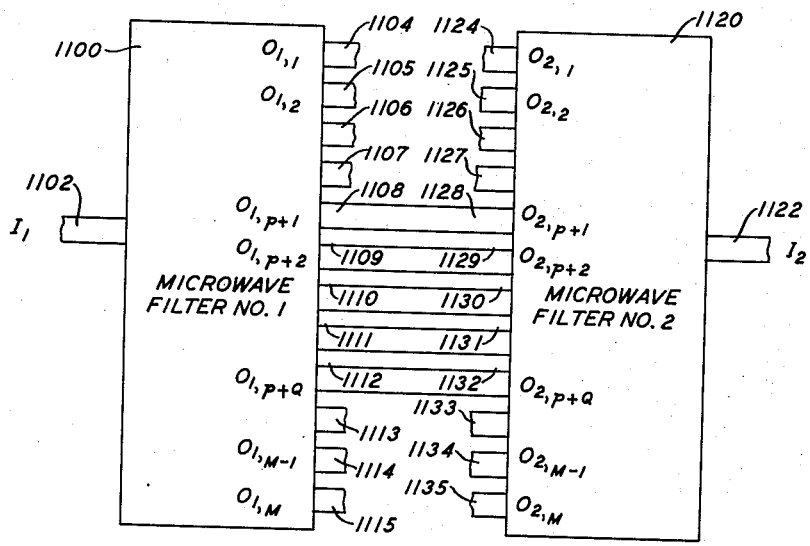
Fig. 11 illustrates a composite or conjugate combination of two structures of the invention to afford improved filtering characteristics.

Fig. 11 shows in block schematic diagrammatic form, two microwave filters of the invention, which can be, for example, two filters of the general type illustrated in Figs. 6A and 6B, and described in detail above.

Microwave filter No. 1, designated 1100, and microwave filter No. 2, designated 1120, can be identical, and as stated above, can be of the type illustrated in Figs. 6A and 6B.

For filter 1100, an input device 1102 is adapted to introduce a broad band of microwave frequencies into the filter. The filter 1100 will then subdivide the broad band input into a plurality of smaller frequency bands which will be directed into a like plurality of output devices represented by output devices 1104 to 1115, inclusive, respectively. By way of example, the filter can be designed, as described in connection with Figs. 6A and 6B, to divide the frequency range extending between 43,500 megacycles and 55,500 megacycles into twelve bands of approximately 1,000 megacycles each, the mid-frequencies of the bands being 44,000, 45,000, 46,000, 47,000, 48,000, 49,000, 50,000, 51,000, 52,000, 53,000, 54,000 and 55,000 megacycles, respectively.

Similarly, for filter 1120, an input device 1122 is adapted to introduce the same broad band of microwave frequencies, as for filter 1100, into the filter and filter 1120 is adapted to subdivide the broad band input into the same plurality of smaller frequency bands, as for filter 1100, and to direct these bands into a like plurality of output devices 1124 to 1135, inclusive, respectively, in the same manner as filter 1100 directed them into its output devices.

However, in the arrangement of Fig. 11, the broad band of frequencies is to be introduced only into the input device 1102 of filter 1100. A portion of the output devices of filter 1100, namely output devices 1108 to 1112, inclusive, are then connected directly to the corresponding output devices 1128 to 1132, inclusive, respectively, of filter 1120 and the input device 1122 of filter 1120, now becomes an output terminal for the combination of the two filters 1100, 1120, shown in Fig. 11, and the five smaller frequency bands, normally appearing at outputs 1108 to 1112, inclusive, of filter 1100, will, obviously, appear together in the output device 1122 of filter 1120. The discrimination of the two combined filters against frequencies not falling within any one of the five smaller bands will obviously be the square of that of either filter alone. Assuming, by way of further example, that the twelve bands mentioned above issue from outputs 1104 to 1115, inclusive, with the highest band issuing from 1104 and the others in order from the successively adjacent outputs, respectively, the specific combination shown in Fig. 11 would pass the band of frequencies between 46,500 and 51,500 megacycles to filter 1120 and "output" device 1122.

The corresponding outputs of the two filters 1100 and 1120 which are joined together can be those of adjacent sub-bands, in which case the band appearing at device 1122 will be a continuous band of frequencies extending from the lowest frequency of the lowest band to the highest frequency of the highest band. Any number of corresponding outputs can obviously be interconnected so that any band width from that of a single channel up to that of the broad band introduced into device 1102 can be obtained at "output" device 1122. In the latter case the over-all device would function merely to eliminate spurious frequencies which did not properly belong within the broad band of frequencies introduced into device 1102.

In general only a portion, or portions, of the broad band introduced into device 1102 will be desired to appear at device 1122, and the other bands appearing at output terminals of filter 1100, which are not connected to corresponding "output terminals" of filter 1120, will be directed to other utilization channels, through other suitably designed filters of the invention if increased frequency discrimination is desired.

The bands transmitted from filter 1100 to filter 1120 need not be adjacent. For example, we can connect outputs 1105, 1106, 1114 and 1115 of filter 1100 to outputs 1125, 1126, 1134 and 1135, respectively of filter 1120, leaving all other outputs between these filters 1100 and 1120 disconnected, and there would then appear in device 1122, two double bands comprising the joined bands of outputs 1104 and 1105 (53,500 to 55,500 megacycles) and the joined bands of outputs 1114 and 1115 (43,500 to 45,500 megacycles), respectively. The discrimination afforded by the over-all combination for both of the double bands would, of course, be the square of that afforded by either filter, alone. An additional microwave filter or filters could then be employed to direct these double bands from output 1122 into separate utilization circuits.

Figure 12:
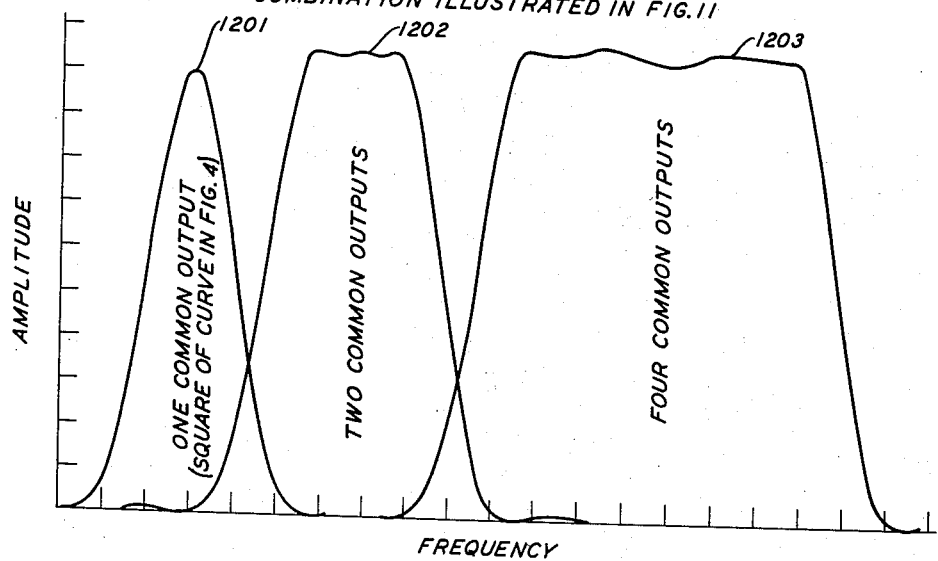
Fig. 12 illustrates frequency-versus-amplitude characteristics which can be obtained by arrangements of the type shown in Fig. 11.

From the above, it is apparent that a large number of combinations and permutations of arrangements can readily be devised, employing the principles illustrated by the diagrammatic showing of Fig. 11. Any width of frequency band within the limits indicated above and several frequency bands of different or like widths, separated by any of numerous readily determinable frequency intervals can obviously be caused to appear in output device 1122, with largely increased discrimination against frequencies outside the passed bands of frequencies, as may be desired to meet predetermined design requirements. Several band widths obtainable in this manner are illustrated by the amplitude-versus-frequency curves 1201, 1202, and 1203 of Fig. 12, the number of outputs which are interconnected being indicated for each curve. Since the unit microwave filters 1100 and 1120, are, as discussed above, of a general type which has practicable physical dimensions for frequencies much higher than those for which filters depending upon resonant cavity technique can be constructed, as a practical matter, the importance of such structures of the invention is outstanding.

Let us analyze mathematically the structure which is represented schematically by Fig. 11. This structure consists, as stated above, of two microwave filters of the invention of the general type represented by those described above, in connection with Figs. 6A and 6B, placed "back to back," with some of the output apertures of one portion connected to the corresponding output apertures of the other, the input 1122 of the second filter 1120 being used as the output of the composite structure.

Let us assume, as illustrated in Fig. 11, that these connections are consecutive, such that each output of the first filter 1100 from 1108 to 1112 is connected to the corresponding output of the second filter 1120 from 1128 to 1132, inclusive, respectively. Let us assume that both filters are lossless and identical. Reasonably close approximations to these assumptions can be attained with this type of filter in actual practice. Let us assume also that at all relevant frequencies within the combined frequency bands of the outputs 1108 to 1112, inclusive, all of the power entering the input 1102 of the filter 1100 appears in the interconnected outputs 1108 to 1112, inclusive (so that even in transition regions between channels the sum of the output powers is equal to the input power). Now let us examine the transmission between input 1102 and output 1122. At frequencies such that none of the power entering input 1102 appears in any of the outputs 1108 to 1112, inclusive, obviously no power will be transmitted from input 1102 to output 1122. At frequencies such that all of the power entering input 1102 appears in one or more of the outputs, 1108 to 1112, inclusive, then all of the power will, obviously, appear in output 1122. This can be proved as follows:

Where all of the power P entering input 1102 appears in one or more of the outputs 1108 to 1112, inclusive, designated by the numerals 1 to 5, inclusive, respectively, in the following equations, we have $$P = \sum_{s=1}^{s=Q} P_{1,\, p+s} \quad (h.1)$$

Assuming, as will be true for identical filters, that output and input impedances of the two filters are alike (an assumption which simplifies the mathematics but is not really necessary to prove the point) and that the input voltage is $V_1$, then the output voltages are $$V_{1,\, p+s} = V_1 \sqrt{\frac{P_{1,\, p+s}}{P}} \epsilon^{i\phi_s} \quad (h.2)$$

where $$\epsilon^{i\phi_s}$$

is the phase factor for any individual output $s$. The second filter 1120 is, as stated above, assumed to be identical to the first filter. From this, and by the principle of reciprocity, we see that the transmission factor of the component from a typical output aperture of filter 1120 to output 1122 is given by the same factor. In other words $$V_{2,\text{comp}} = V_{2,\,p+s} \sqrt{\frac{P_{1,\,p+s}}{P}} \epsilon^{i\phi_s} \quad (h.3)$$

But the corresponding outputs of the two filters are connected together so that $$V_{2,\,p+s} = V_{1,\,p+s} \epsilon^{i\phi_{s'}} \quad (h.3)'$$

where $\phi_{s'}$ is a phase factor inserted between the two outputs by adding the extra lines between the corresponding outputs, viz. 1108 to 1112, inclusive, of filter 1100 and 1128 to 1138, inclusive, respectively, of filter 1120. From this it follows that $$V_{2\,\text{comp}} = V_1 \left[\sqrt{\frac{P_{1,\,p+s}}{P}} \epsilon^{i\phi_s}\right]\left[\sqrt{\frac{P_{1,\,p+s}}{P}} \epsilon^{i\phi_{s'}}\right] = V_1 \frac{P_{1,\,p+s}}{P} \epsilon^{i(2\phi_s + \phi_{s'})} \quad (h.4)$$

but $$V_2 = \sum V_{2\,\text{comp}} = \sum_{s=1}^{s=Q} V_1 \frac{P_{1,\,p+s}}{P} \epsilon^{i(2\phi_s + \phi_{s'})} \quad (h.5)$$

Now if the output of the filter 1100 is as given by Equation b.2 then $\phi_s$ is independent of $s$. In any case we can choose $\phi_{s'}$ so that $(2\phi_s + \phi_{s'})$ is independent of $s$ and $\phi_k$. Then $$V_2 = V_1 \epsilon^{i\phi_k} \sum_{s=1}^{Q} \frac{P_{1p+s}}{P} = V_1 \epsilon^{i\phi_k} \quad (h.6)$$

by applying Equation h.1. It follows that under the above assumptions $|V_2| = |V_1|$ and there is no transmission loss between input 1102 and output 1122.

Let us now examine the over-all amplitude-versus-frequency characteristic of the transmission between input 1102 and output 1122. At the lower frequencies in the range of the filters 1100 and 1120 the power will fall entirely into the outputs 1104 to 1107, inclusive, and not at all into the outputs 1108 to 1112, inclusive, and accordingly no power will be transmitted from input 1102 to output 1122. As the frequency increases above the maximum output frequency of output 1107, power will begin to flow into output 1108 and consequently into output 1122. Then over the frequency range in which all power flows into the group of outputs 1108 to 1112, inclusive, all power will flow from input 1102 to output 1122 as demonstrated above. As the frequency is increased further, power will begin to flow into output 1113 and the transmission from input 1102 to output 1122 will begin to diminish until finally, when all the power flows into the group of outputs 1113 to 1115, inclusive, none will reach output 1122.

We can, as stated hereinabove, put just as many or as few outputs into the common group as we wish. The band can therefore be made as wide as any multiple of the band of an individual channel and will be substantially flat over this range. While the total attenuation at frequencies well outside the passed band or bands of frequencies is substantially doubled by the use of two filters in tandem, or conjugate relation, as described above, the steepness of the sides of the passed band remains a constant (i. e., the discrimination against frequencies closely adjacent to the edges of the passed band of frequencies remains constant) where a given component filter design is used and is of the order of steepness of the sides of a single output taken by itself. To increase this steepness we must decrease the band width of the outputs by altering the parameters as discussed in previous sections.

It is evident, as mentioned above, that the unused outputs of filter 1100 may be connected in a similar fashion to other conjugate filters in such a way that the entire frequency range of $F_1$ is divided up into flat-topped and steep-sided bands.

It is evident, in general, that by employing "Q" common outputs in the conjugate structure of Fig. 8, that we can obtain transmission characteristics with the same order of generality as those available in a lumped-circuit filter with "Q" resonances, where "Q" is any integral number. The precise design in the case of microwave filters of the invention, as in the lumped-element filter-circuit case, will depend on the requirements. The band can be made maximally flat, rippled or otherwise, and the degree of steepness of the sides of the band can be adjusted within wide limits.

Some possible curves are, as mentioned above, illustrated by way of example in Fig. 12. These curves will result when two identical filters, each capable of producing curves as shown in Fig. 4, but with appropriately modified spacings, are combined as illustrated in Fig. 11.

The above discussion has provided an account of how a diagrammatically represented combination of microwave filters of the invention can be used to produce branching filters with very general amplitude versus frequency characteristics. In connection with such a combination there will of course be present the problems discussed for a simple microwave filter of the invention in section b.

Figure 13:
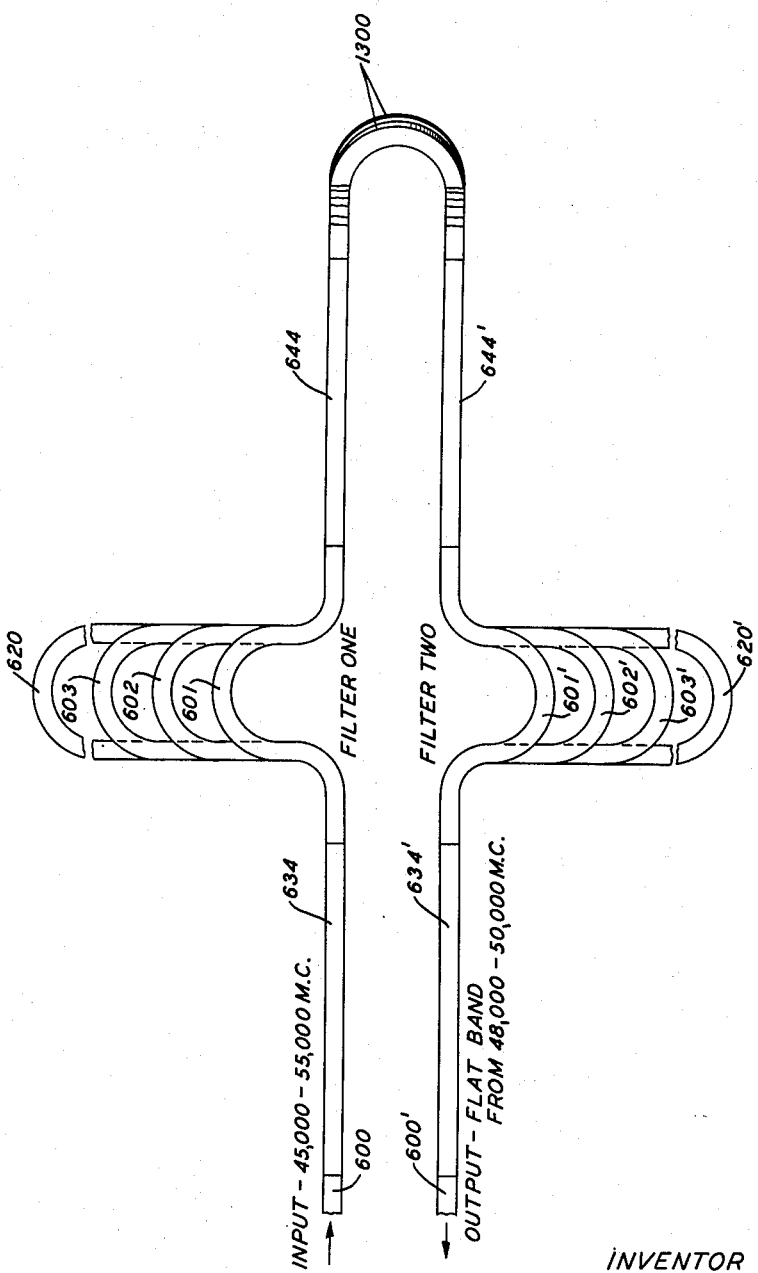

A specific example of the combination type of filter is illustrated in Fig. 13. In Fig. 13 two filters as illustrated in Figs. 6A and 6B and described in detail above are shown, the principal corresponding parts of filter number one, bearing the same designation numbers as for the filter of Figs. 6A and 6B. For filter number two the same designation numbers with a prime mark added to each are employed and indicate the principal corresponding parts of filter number two.

At the output ends of sections 644 and 644' in Fig. 13, a plurality of four, by way of example, U-shaped sections of wave guide are shown which connect four outputs of filter number one to the corresponding four "outputs" of filter number two. If these four outputs represent four 1000 megacycle frequency bands centered about the frequencies 48,500, 49,500, 50,500 and 51,500 megacycles, respectively, then the output of device 600' will comprise the frequency range of 48,000 to 52,000 megacycles, inclusive.

As a further example of the possibilities of combining or "compounding" filter structures of the invention there is shown in Fig. 14 a combination of three filters of the invention of the type disclosed in Fig. 7, described in detail above.

The center filter, designated filter number one, is energized by a broad band of frequencies, for example, the band between 45,500 and 54,500 megacycles. The outputs of filter number one from which will issue frequency bands 1000 megacycles wide, centered about frequencies 46,000, 47,000 and 48,000 megacycles, respectively, are joined to the corresponding outputs of filter number two by waveguide loops 1406, 1048 and 1410, respectively. Similarly, the outputs of filter number one from which will issue frequency bands 1000 megacycles wide centered about frequencies 52,000, 53,000 and 54,000 megacycles, respectively, are joined to the corresponding outputs of filter number three by wave-guide loops 1412, 1414 and 1416, respectively.

From the output 1404 of filter number two, therefore, a flat band of frequencies from 45,500 to 48,500 megacycles, inclusive, will be obtained and from the output 1402 of filter number three, a flat band of frequencies between 51,400 to 54,500 megacycles, inclusive, will be obtained.

In Fig. 15 a single filter of the type shown in Fig. 7, as described in detail above, is employed in a "reflexing" scheme. As shown in Fig. 15, output 738 is connected by wave-guide loop 1500 to output 735; output 737 is connected by wave-guide loop 1502 to output 734; and output 736 is connected by wave-guide loop 1504 to output 733. This has the effect of reinserting the 1000 megacycle bands centered about 46,000, 47,000 and 48,000 megacycles, at the outputs 735, 734 and 733, respectively. These bands travel down the reflecting structure comprising wave-guide sections 701 to 720, inclusive, are reflected at the respective short-circuited right ends of these sections and, returning to the open left ends of the wave-guide sections, are directed, by reason of the respective relative angular relations obtaining, into output 732, from which, in normal operation of the device of Fig. 7, the 1000 megacycle band centered about 52,000 megacycles would issue. There is thus added to the normal band from output 732, a band extending from 45,500 to 48,500 megacycles, inclusive. This broader band can then be separated by an additional filter from the normal 1000 megacycle band or alternatively the normal 1000 megacycle band centered about 52,000 megacycles can be removed by a filter prior to introducing the broad band of frequencies into the input 700, of the over-all filter. The arrangement of Fig. 15, obviously, results in passing the broad band between 45,500 to 48,500 megacycles, inclusive, a second time through the filter structure and thus is equivalent to using two filters in tandem as shown in Figs. 13 and 14.

The operation of the device of Fig. 15 will be more readily understood from the diagrammatic showing given in Fig. 16.

In Fig. 16 the device of Fig. 15 is reproduced with the addition of "effective reflecting surfaces" 1640, 1650 and 1660 and lines 1600 to 1603, 1610 to 1613, and 1620 to 1623, all inclusive.

The "effective reflecting surface" 1640 is a hypothetical surface which would reflect an energy beam whose frequencies were within the 1000 megacycle band centered about the mid-frequency of 46,000 megacycles, into the lowest output 738 when the beam is introduced into the input termination 700. This "effective reflecting surface" represents graphically the reflective properties of the over-all assembly of Fig. 15 with respect to this particular 1000 megacycle band.

Likewise "effective reflecting surface" 1650 represents the reflecting properties of the over-all structure of Fig. 15 with respect to the 1000 megacycle band centered about 47,000 megacycles whereby energy within this frequency band when introduced into input 700 will be reflected to output 737.

In the same manner "effective reflecting surface" 1660 represents the reflective properties of the over-all assembly of Fig. 15 with respect to the 1000 megacycle band centered about 48,000 megacycles, energy within this last-mentioned band when introduced into input 700 being reflected into output 736.

The lines 1600, 1610 and 1620 represent energy within the three 1000 megacycle bands centered about the mid-frequencies 46,000, 47,000 and 48,000 megacycles, respectively.

The lines 1601, 1611 and 1621 represent the reflections of this energy from the "effective reflecting surfaces" 1640, 1650 and 1660, respectively into outputs 738, 737 and 736, respectively.

Loops of wave guide 1502, 1504 and 1506 transmit the energy from outputs 738, 737 and 736 to outputs 735, 734 and 733, respectively, from which it is directed as indicated by lines 1602, 1612 and 1622, respectively. Upon reflection from "effective reflecting surfaces" 1640, 1650 and 1660, respectively, a second time, as represented by lines 1603, 1613 and 1623, respectively, all of the energy reaches the single output 732. As this energy has twice been directed into the assembly of wave-guide sections 701 to 720, inclusive, and reflected back from their respective far (right) ends, the discrimination against frequencies outside the three above-mentioned bands will be the square of that which a single passage through the structure would afford.

(i) *Duplex microwave filter design*

With the principles employed above firmly in mind, some further microwave filter configurations which may, in some cases, be more economical are more readily understood. In a configuration of this sort, waves are reflected one or more times so that part or all of the structure is used more than once.

The filters illustrated in Figs. 7 and 15 of the accompanying drawings and described in detail above, are examples of the multiple use of structure. In these filters each section of line in the delay manifold transmits at least two waves, one direct and one reflected. Furthermore the input and output regions coincide.

It has, of course, also been shown above that it is entirely feasible to employ composite or conjugate structures i. e., to construct conjugate or composite filter combinations as illustrated, for example, in Fig. 14.

The economies described in the previous two paragraphs can also be combined resulting in structures such as the one illustrated in Fig. 15.

(j) *Continuous delay manifolds*

The use of separate pipes in the delay manifolds of microwave filters makes possible certain economies of size measured in wavelength. When the frequency becomes very high and the wavelength consequently very short such economy may become unnecessary and even undesirable. It may become difficult or impossible to build individual delay lines since these become unmanageably small.

In frequency ranges so high that it is no longer practical to build individual delay lines the delay manifold can be formed in effect by a suitable shaping of the input and output regions. The paths of different lengths from the input or outputs to various parts of a reflecting or refracting array provide then, in effect, the different parts of the delay manifold.

One possibility is to confine the continuous array of paths between parallel conducting plates. Even this may become impractical if the wavelength is extremely small. If the plates are omitted we have a design which spreads out in three dimensions, though its principles may normally be understood by study of two dimensional cross sections.

With three-dimensional designs of this sort we are approaching closely the domain of optical spectroscopy. However, there remain points of difference which must be taken into consideration in the design of such microwave filters, as will become apparent from the following discussion.

The microwave antenna filter of Fig. 17 is a combination adaptable for use at very short microwave frequencies. In Fig. 17 an incoming plane front wave 1700, represented by the five parallel horizontal arrows, as shown, strikes a zoned lens antenna 1702 of the same general type but of somewhat different configuration as those illustrated and described in the paper entitled "Metal Lens Antennas" by W. E. Kock published in the Proceedings of the I. R. E. for November 1946. The lens is inclined at an angle of 45 degrees, as shown in Fig. 17 as the angle between tangential line 1704 and vertical. The horizontal and vertical over-all projected dimensions A and B of the zoned lens are equal and its dimension, in a plane perpendicular to the plane of the drawing can also be equal to dimensions A and B.

The group of four, slightly converging vertical, arrows 1706 represent the incoming wave after passing through antenna 1702. As is well known to those skilled in the art the components of the incoming wave energy will be directed downwardly at a different angle for each frequency so that, for example, if the incoming wave contains energy having frequencies distributed over the frequency range 74,000 megacycles to 130,000 megacycles, inclusive, this broad band will be separated into nine smaller bands of, for example, 6000 megacycles each, which nine bands will be directed into the outputs 1711 to 1719, inclusive, of the nine channels 1 to 9, inclusive, respectively.

Figure 18B:
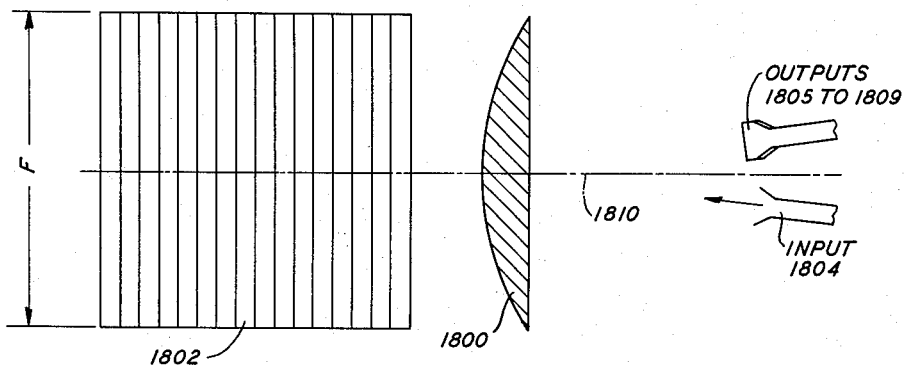

Another combination of this general class is illustrated in Figs. 18A and 18B. The filter of Figs. 18A and 18B is constructed as a combination of a lens antenna 1800 and a stepped reflecting grating 1802. Its operation is as follows. The input feed 1804 illuminates the lens 1800 to generate a plane wave. This plane wave is reflected by the grating in a direction which is a function of frequency. The output feeds 1805 to 1809, inclusive, receive waves in a direction which is a function of their position. Consequently in the combination each of the outputs receives waves of a frequency band which is a function of its position.

With the configuration oriented as shown the output feed displacement due to frequency change is horizontal. The input feed and output feeds may then be separated in space by the simple expedient of vertical displacement with respect to center line 1810 as shown in Fig. 18B. For the lens antenna 1800 of Figs. 18A and B, any efficient design will serve. For example, see W. E. Kock's above-mentioned paper in the Proceedings of the I. R. E. The output feeds for the various bands are spaced $$\frac{\Delta f}{f_0} A$$

where $f_0$ is the midband frequency and A is the focal length of lens antenna 1800. The input feed is spaced below and the output feeds above the horizontal plane by the distance $$\frac{\Delta f}{f_0} A$$

For the reflective grating 1802, the dimensions D, E and F can be equal and can have the value $$\frac{2\lambda^*}{3}$$

where $\lambda^*$ is $$\frac{c}{\Delta f}$$

c is the speed of light and $\Delta f$ is the center frequency difference between adjacent frequency bands or channels to be separated. The width and depth of each step are equal and each step width is $$\frac{\lambda_0}{2}$$

where $\lambda_0$ is the wavelength in free space of the mid-frequency of the over-all frequency band which is to be subdivided into the smaller frequency bands.

As an example, to divide the range around 100,000 megacycles into bands spaced 1,000 megacycles center-to-center, the formulas given above for the combination of Figs. 18A and 18B, show that we would need about an eight-inch aperture. The grating would have steps about ⅛ inch in width and in depth. With a focal length (A) of 17 inches for the lens, the feeds would be spaced about 1/16 inch center-to-center. A device of this sort, in this frequency range and higher, is obviously considerably more practical than a lumped-circuit network or an array of separate delay paths.

With a configuration of the type shown in Figs. 18A and 18B conjugate filter techniques for obtaining flat-topped and steep-sided bands may be applied without duplication of lens or grating. By way of one specific example, this can be done as illustrated in Fig. 19.

Figure 19:
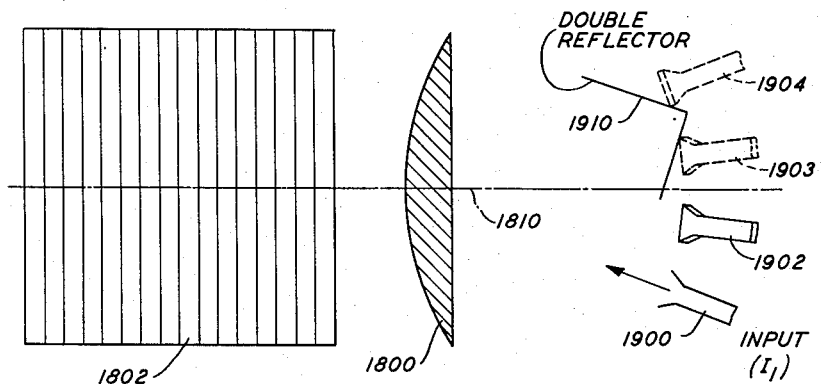
Fig. 19 is a further modification of the structure of Figs. 18A and 18B wherein the degree of utilization is still further increased.

In the arrangement of Fig. 19 a combination of lens antenna 1800 and reflecting grating 1802 as for that of Figs. 18A and 18B is employed. In Fig. 19, however, the input feed 1900 is placed lower vertically (with respect to center line 1810) so that the output feeds for receiving their respective channels after a single reflection would need to be positioned higher vertically about as indicated by the imaginary dotted output 1904. However, in order to pass the energy a second time through the lens 1800 and reflector 1802 combination, a corner reflector member 1910 is positioned to intercept the energy which is directed toward the imaginary output 1904 and reflect it back into the lens 1800 as through it were introduced by an imaginary input feed 1903 shown just above the horizontal center line 1810. After being reflected from reflector 1802 through lens 1800 a second time the energy will reach a set of final output feeds 1902 slightly below center line 1810 as shown in Fig. 19. Having been twice through the combination of lens 1800 and reflector 1802 the discrimination against unwanted frequencies is, of course, doubled.

Numerous and varied other arrangements and combinations embodying the principles of the present invention will readily occur to those skilled in the art. No attempt has here been made to exhaustively cover such possibilities, the arrangements shown being illustrative of the application of said principles.

What is claimed is:

1. An electromagnetic microwave filter comprising a delay manifold consisting of a plurality of lengths of wave guide of like cross section and of progressively increasing length, each said length of wave guide having an input aperture and a short-circuited or closed opposite end, the input apertures being aligned on an arc the radius of which is at least equal to the sum of the combined widths of all the apertures, an input device and a plurality of output devices aligned on a second arc of substantially the same radius as said first-mentioned arc, the concave surfaces of said arcs facing each other, the center points of both arcs lying on the longitudinal center line of the filter the distance between said center points being at least equal to the radius of said arcs and two pair of substantially parallel plates, which substantially enclose an input-output region.

2. An electromagnetic microwave filter for separating a predetermined wide band of frequencies into a plurality of predetermined more narrow bands of frequencies, which filter comprises a reflecting and refracting means the refracting properties of which vary appreciably over said wide frequency band, means for distributing the input energy comprising said wide band of frequencies over an appropriate surface of said reflecting and refracting means in accordance with a predetermined mode of distribution, a plurality of means for collecting different subportions of said wide band of frequencies corresponding to said plurality of predetermined more narrow bands of frequencies, said last-stated plurality of means being positioned with respect to an appropriate output surface of said reflecting and refracting means to intercept said plurality of more narrow bands of frequencies after reflection and refraction by said reflecting and refracting means, respectively, and additional means for directing certain of the collected sub-portions of said wide frequency band back into the said reflecting and refracting means and means for again collecting said certain sub-portions after being reflected and refracted a second time by said refracting means.

3. The filter of claim 2 in which said means for directing certain of the collected sub-portions of said broad band of frequencies back into the said refracting means comprises a wave-guide loop for each of said certain sub-portions connecting its primary collecting means to appropriately positioned secondary injecting means.

4. An electromagnetic microwave filter comprising a delay manifold consisting of a plurality of lengths of wave guide of like cross section and of progressively increasing length, each said length of wave guide having an input aperture and a short-circuited or closed opposite end, the input apertures being aligned on an arc the radius of which is at least equal to the sum of the combined widths of all the apertures, an input device and a plurality of output devices aligned on a second arc of substantially the same radius as said first-mentioned arc, the concave surfaces of said arcs facing each other, the distance between said arcs being at least equal to said arc radius, two pair of substantially parallel plates enclosing an input-output region between said two arcs, and means comprising sections of wave guide interconnecting a first plurality of said outputs to a second like plurality of said outputs whereby the sub-portions of the input frequency band reaching said first plurality of outputs are redirected into the input of said delay manifold and emerge from a different output or outputs upon again issuing from said delay manifold.

5. An electromagnetic wave, microwave frequency, filter comprising a delay manifold consisting of a plurality of lengths of wave guide of like cross-section and of progressively increasing length, each said length of guide having an input aperture and an electrically short-circuited or closed opposite end, the input apertures being aligned contiguously in order of their respective relative lengths, input means for distributing electromagnetic wave energy including a wide band of microwave frequencies over said alignment of input apertures and output means angularly positioned with respect to said apertures to receive electromagnetic wave energy of frequencies within a restricted portion only of said wide band of frequencies whereby said restricted portion of said wide band of frequencies is isolated in said output means.

WILLARD D. LEWIS.

References Cited in the file of this patent
UNITED STATES PATENTS

| Number | Name | Date |
|---|---|---|
| 2,367,764 | Ferris | Jan. 23, 1945 |
| 2,408,435 | Mason | Oct. 1, 1946 |
| 2,411,872 | Feldman et al. | Dec. 3, 1946 |
| 2,526,573 | Mason | Oct. 17, 1950 |
| 2,530,580 | Lindenblad | Nov. 21, 1950 |